(12) United States Patent
Tremaine

(10) Patent No.: US 7,584,336 B2
(45) Date of Patent: Sep. 1, 2009

(54) SYSTEMS AND METHODS FOR PROVIDING DATA MODIFICATION OPERATIONS IN MEMORY SUBSYSTEMS

(75) Inventor: Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 11/422,915

(22) Filed: Jun. 8, 2006

(65) Prior Publication Data

US 2007/0288707 A1 Dec. 13, 2007

(51) Int. Cl.
*G06F 12/00* (2006.01)
(52) U.S. Cl. .......................... 711/155; 711/5; 711/154; 711/170
(58) Field of Classification Search .................. None
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt | |
| 3,825,904 A | 7/1974 | Burk et al. | 340/172.5 |
| 4,028,675 A | 6/1977 | Frankenberg | 711/106 |
| 4,135,240 A | 1/1979 | Ritchie | |
| 4,150,428 A | 4/1979 | Inrig et al. | |
| 4,472,780 A | 9/1984 | Chenoweth et al. | |
| 4,475,194 A | 10/1984 | LaVallee et al. | 371/10 |
| 4,486,739 A | 12/1984 | Franaszek et al. | 340/347 |
| 4,641,263 A | 2/1987 | Perlman et al. | |
| 4,654,857 A | 3/1987 | Samson et al. | |
| 4,723,120 A | 2/1988 | Petty, Jr. | 340/825.02 |

(Continued)

FOREIGN PATENT DOCUMENTS

EP 0229316 A2 7/1987

(Continued)

OTHER PUBLICATIONS

PCT International Search Report PCT/EP2006/068984. Mailed Feb. 16, 2007.

(Continued)

*Primary Examiner*—Jack A Lane
(74) *Attorney, Agent, or Firm*—Cantor Colburn LLP

(57) ABSTRACT

Systems and methods for providing data modification operations in memory subsystems. Systems include a plurality of memory devices, a memory controller, one or more memory busses connected to the memory controller and a memory hub device. The memory controller receives and responds to memory access requests including memory update requests from a processor. The memory controller also generates a memory update command in response to receiving a memory update request. The memory hub device includes a first port, a second port and a control unit. The first port is in communication with the memory controller via one or more of the memory busses for transferring data and control information between the memory hub device and the memory controller. The second port is in communication with one or more of the memory devices. The control unit decodes the memory update command from the data and control information and accesses the memory devices via the second port to perform the memory update command local to the memory hub devices as a logical read-modify-write sequence.

33 Claims, 9 Drawing Sheets

U.S. PATENT DOCUMENTS

| | | | |
|---|---|---|---|
| 4,740,916 A | 4/1988 | Martin | 364/900 |
| 4,796,231 A | 1/1989 | Pinkham | 365/189.05 |
| 4,803,485 A | 2/1989 | Rypinkski | 370/452 |
| 4,833,605 A | 5/1989 | Terada et al. | 364/200 |
| 4,839,534 A | 6/1989 | Clasen | 307/269 |
| 4,943,984 A | 7/1990 | Pechanek et al. | 375/109 |
| 4,985,828 A | 1/1991 | Shimizu et al. | 364/200 |
| 5,053,947 A | 10/1991 | Heibel et al. | 364/200 |
| 5,177,375 A | 1/1993 | Ogawa et al. | |
| 5,206,946 A | 4/1993 | Brunk | 710/2 |
| 5,214,747 A | 5/1993 | Cok | 395/27 |
| 5,265,049 A | 11/1993 | Takasugi | |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,454,091 A | 9/1995 | Sites et al. | 395/413 |
| 5,475,690 A | 12/1995 | Burns et al. | 370/105.3 |
| 5,513,135 A | 4/1996 | Dell et al. | 365/52 |
| 5,517,626 A | 5/1996 | Archer et al. | |
| 5,522,064 A | 5/1996 | Aldereguia et al. | |
| 5,544,309 A | 8/1996 | Chang et al. | |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,594,925 A | 1/1997 | Harder et al. | |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A | 8/1997 | Rondeau, II et al. | 365/63 |
| 5,666,480 A | 9/1997 | Leung et al. | 395/180 |
| 5,684,418 A | 11/1997 | Yanagiuchi | |
| 5,706,346 A | 1/1998 | Katta et al. | |
| 5,754,804 A | 5/1998 | Cheselka et al. | |
| 5,764,155 A | 6/1998 | Kertesz et al. | 340/825.08 |
| 5,822,749 A | 10/1998 | Agarwal | 707/2 |
| 5,852,617 A | 12/1998 | Mote, Jr. | 714/726 |
| 5,870,325 A | 2/1999 | Nielsen et al. | 365/63 |
| 5,872,996 A | 2/1999 | Barth et al. | 395/853 |
| 5,917,760 A | 6/1999 | Millar | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,959,914 A | 9/1999 | Gates et al. | |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 6,003,121 A | 12/1999 | Wirt | |
| 6,011,732 A | 1/2000 | Harrison et al. | |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | 712/230 |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,170,047 B1 | 1/2001 | Dye | 711/170 |
| 6,170,059 B1 | 1/2001 | Pruett et al. | 713/200 |
| 6,173,382 B1 | 1/2001 | Dell et al. | 711/170 |
| 6,185,718 B1 | 2/2001 | Dell et al. | |
| 6,198,304 B1 | 3/2001 | Sasaki | |
| 6,215,686 B1 | 4/2001 | Deneroff et al. | 365/52 |
| 6,219,288 B1 | 4/2001 | Braceras et al. | |
| 6,219,760 B1 | 4/2001 | McMinn | |
| 6,233,639 B1 | 5/2001 | Dell et al. | |
| 6,260,127 B1 | 7/2001 | Olarig et al. | 711/167 |
| 6,262,493 B1 | 7/2001 | Garnett | |
| 6,285,172 B1 | 9/2001 | Torbey | |
| 6,292,903 B1 | 9/2001 | Coteus et al. | 713/401 |
| 6,301,636 B1 | 10/2001 | Schultz et al. | 711/108 |
| 6,308,247 B1 | 10/2001 | Ackerman et al. | |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,349,390 B1 | 2/2002 | Dell et al. | |
| 6,357,018 B1 | 3/2002 | Stuewe et al. | |
| 6,370,631 B1 | 4/2002 | Dye | 711/170 |
| 6,378,018 B1 | 4/2002 | Tsern et al. | 710/129 |
| 6,381,685 B2 | 4/2002 | Dell et al. | |
| 6,393,512 B1 | 5/2002 | Chen et al. | |
| 6,393,528 B1 | 5/2002 | Arimilli et al. | 711/137 |
| 6,408,398 B1 | 6/2002 | Frecker et al. | |
| 6,425,044 B1 | 7/2002 | Jeddeloh | |
| 6,446,174 B1 | 9/2002 | Dow | |
| 6,467,013 B1 | 10/2002 | Nizar | |
| 6,473,836 B1 | 10/2002 | Ikeda | 711/137 |
| 6,477,614 B1 | 11/2002 | Leddige et al. | |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Widmer | 375/242 |
| 6,496,910 B1 | 12/2002 | Baentsch et al. | 711/165 |
| 6,499,070 B1 | 12/2002 | Whetsel | |
| 6,502,161 B1 | 12/2002 | Perego et al. | 711/5 |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,530,007 B2 | 3/2003 | Olarig | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | 713/322 |
| 6,584,576 B1 | 6/2003 | Co | |
| 6,587,912 B2 | 7/2003 | Leddige | |
| 6,590,827 B2 | 7/2003 | Chang et al. | |
| 6,594,713 B1 * | 7/2003 | Fuoco et al. | 710/31 |
| 6,594,748 B1 | 7/2003 | Lin | |
| 6,601,121 B2 | 7/2003 | Singh et al. | 710/112 |
| 6,601,149 B1 | 7/2003 | Brock et al. | |
| 6,604,180 B2 | 8/2003 | Jeddeloh | |
| 6,611,905 B1 | 8/2003 | Grundon et al. | 711/167 |
| 6,622,217 B2 | 9/2003 | Gharacorloo et al. | 711/141 |
| 6,622,227 B2 * | 9/2003 | Zumkehr et al. | 711/167 |
| 6,625,687 B1 | 9/2003 | Halbert et al. | 711/105 |
| 6,625,702 B2 | 9/2003 | Rentscler et al. | |
| 6,628,538 B2 | 9/2003 | Funaba et al. | 365/63 |
| 6,631,439 B2 | 10/2003 | Saulsbury et al. | 711/104 |
| 6,636,957 B2 | 10/2003 | Stevens et al. | |
| 6,643,745 B1 | 11/2003 | Palanca et al. | |
| 6,671,376 B1 | 12/2003 | Koto et al. | 380/210 |
| 6,678,811 B2 | 1/2004 | Rentschler et al. | 711/167 |
| 6,681,292 B2 * | 1/2004 | Creta et al. | 711/119 |
| 6,684,320 B2 | 1/2004 | Mohamed et al. | |
| 6,697,919 B2 | 2/2004 | Gharachorloo et al. | 711/141 |
| 6,704,842 B2 | 3/2004 | Janakiraman et al. | 711/141 |
| 6,721,185 B2 | 4/2004 | Dong et al. | |
| 6,721,944 B2 | 4/2004 | Chaudhry et al. | 717/154 |
| 6,738,836 B1 | 5/2004 | Kessler et al. | 710/22 |
| 6,741,096 B2 | 5/2004 | Moss | |
| 6,748,518 B1 | 6/2004 | Guthrie et al. | |
| 6,754,762 B1 | 6/2004 | Curley | |
| 6,766,389 B2 | 7/2004 | Hayter et al. | 710/62 |
| 6,775,747 B2 | 8/2004 | Venkatraman | 711/137 |
| 6,791,555 B1 | 9/2004 | Radke et al. | 345/532 |

| | | | | | |
|---|---|---|---|---|---|
| 6,799,241 B2 | 9/2004 | Kahn et al. | 2003/0105938 A1 | 6/2003 | Cooksey et al. |
| 6,839,393 B1 | 1/2005 | Sidiropoulos ............... 375/371 | 2003/0118044 A1 | 6/2003 | Blanc et al. |
| 6,877,076 B1 | 4/2005 | Cho et al. .................... 711/157 | 2003/0126354 A1 | 7/2003 | Kahn et al. |
| 6,877,078 B2 | 4/2005 | Fujiwara et al. ............. 711/167 | 2003/0126363 A1 | 7/2003 | David |
| 6,882,082 B2 | 4/2005 | Greeff et al. | 2003/0223303 A1 | 12/2003 | Lamb et al. ............. 365/230.06 |
| 6,889,284 B1 | 5/2005 | Nizar et al. .................. 710/315 | 2003/0229770 A1* | 12/2003 | Jeddeloh ...................... 711/213 |
| 6,898,726 B1 | 5/2005 | Lee | 2003/0235222 A1 | 12/2003 | Bridges et al. |
| 6,910,146 B2 | 6/2005 | Dow | 2003/0236959 A1 | 12/2003 | Johnson et al. ............. 711/167 |
| 6,918,068 B2 | 7/2005 | Vail et al. | 2004/0006674 A1 | 1/2004 | Hargis et al. ................ 711/156 |
| 6,938,119 B2 | 8/2005 | Kohn et al. | 2004/0015650 A1* | 1/2004 | Zumkehr et al. ............ 711/105 |
| 6,944,084 B2 | 9/2005 | Wilcox | 2004/0049723 A1 | 3/2004 | Obara ......................... 714/729 |
| 6,948,091 B2 | 9/2005 | Bartels et al. | 2004/0078615 A1 | 4/2004 | Martin et al. |
| 6,949,950 B2 | 9/2005 | Takahashi et al. ............. 326/37 | 2004/0098546 A1* | 5/2004 | Bashant et al. .............. 711/156 |
| 6,965,952 B2 | 11/2005 | Echartea et al. | 2004/0098549 A1 | 5/2004 | Dorst |
| 6,977,536 B2 | 12/2005 | Chin-Chieh et al. ......... 327/116 | 2004/0117588 A1 | 6/2004 | Arimilli et al. .............. 711/203 |
| 6,993,612 B2 | 1/2006 | Porterfield | 2004/0123222 A1 | 6/2004 | Widmer |
| 6,996,639 B2 | 2/2006 | Narad | 2004/0128474 A1 | 7/2004 | Vorbach ........................ 712/10 |
| 7,047,370 B1 | 5/2006 | Jeter, Jr. et al. | 2004/0148482 A1 | 7/2004 | Grundy et al. |
| 7,047,371 B2 | 5/2006 | Dortu | 2004/0160832 A1 | 8/2004 | Janzen et al. |
| 7,047,384 B2 | 5/2006 | Bodas et al. | 2004/0163028 A1 | 8/2004 | Olarig |
| 7,076,700 B2 | 7/2006 | Rieger | 2004/0165609 A1 | 8/2004 | Herbst et al. |
| 7,103,792 B2 | 9/2006 | Moon | 2004/0199363 A1 | 10/2004 | Bohizic et al. |
| 7,120,743 B2 | 10/2006 | Meyer et al. | 2004/0205433 A1 | 10/2004 | Gower et al. |
| 7,133,790 B2 | 11/2006 | Liou | 2004/0230718 A1 | 11/2004 | Polzin et al. .................. 710/22 |
| 7,133,972 B2 | 11/2006 | Jeddeloh | 2004/0246767 A1 | 12/2004 | Vogt ............................ 365/154 |
| 7,177,211 B2 | 2/2007 | Zimmerman | 2004/0250153 A1 | 12/2004 | Vogt ............................ 713/500 |
| 7,194,593 B2 | 3/2007 | Schnepper | 2004/0260909 A1 | 12/2004 | Lee et al. ..................... 711/213 |
| 7,197,594 B2 | 3/2007 | Raz et al. | 2004/0260957 A1 | 12/2004 | Jeddeloh et al. |
| 7,203,318 B2 | 4/2007 | Collum et al. | 2005/0023560 A1 | 2/2005 | Ahn et al. .................... 257/200 |
| 7,206,887 B2 | 4/2007 | Jeddeloh | 2005/0027941 A1 | 2/2005 | Wang et al. |
| 7,206,962 B2 | 4/2007 | Deegan | 2005/0044305 A1 | 2/2005 | Jakobs et al. |
| 7,210,059 B2 | 4/2007 | Jeddeloh | 2005/0050237 A1 | 3/2005 | Jeddeloh et al. ............... 710/10 |
| 7,216,196 B2 | 5/2007 | Jeddeloh | 2005/0050255 A1 | 3/2005 | Jeddeloh ...................... 710/317 |
| 7,216,276 B1 | 5/2007 | Azimi et al. | 2005/0066136 A1 | 3/2005 | Schnepper ................... 711/154 |
| 7,222,213 B2* | 5/2007 | James ............................ 711/5 | 2005/0071542 A1 | 3/2005 | Weber et al. |
| 7,227,949 B2 | 6/2007 | Heegard et al. | 2005/0071707 A1 | 3/2005 | Hampel |
| 7,240,145 B2 | 7/2007 | Holman | 2005/0078506 A1 | 4/2005 | Rao et al. |
| 7,260,685 B2 | 8/2007 | Lee et al. | 2005/0080581 A1 | 4/2005 | Zimmerman et al. ......... 702/117 |
| 7,266,634 B2 | 9/2007 | Ware et al. | 2005/0081129 A1 | 4/2005 | Shah et al. |
| 7,296,129 B2 | 11/2007 | Gower et al. | 2005/0086424 A1 | 4/2005 | Oh et al. |
| 7,313,583 B2 | 12/2007 | Porten et al. | 2005/0086441 A1 | 4/2005 | Myer et al. |
| 7,319,340 B2* | 1/2008 | Jeddeloh et al. .............. 324/763 | 2005/0097249 A1 | 5/2005 | Oberlin et al. |
| 7,321,979 B2 | 1/2008 | Lee | 2005/0105350 A1 | 5/2005 | Zimmerman et al. |
| 7,328,381 B2* | 2/2008 | Jeddeloh et al. .............. 714/718 | 2005/0120157 A1 | 6/2005 | Chen et al. ................... 710/313 |
| 7,353,316 B2 | 4/2008 | Erdmann | 2005/0125702 A1 | 6/2005 | Huang et al. |
| 7,363,419 B2 | 4/2008 | Cronin et al. | 2005/0125703 A1 | 6/2005 | Lefurgy et al. |
| 7,363,436 B1 | 4/2008 | Yeh et al. | 2005/0138246 A1 | 6/2005 | Chen et al. |
| 7,370,134 B2* | 5/2008 | Jeddeloh ...................... 710/311 | 2005/0138267 A1 | 6/2005 | Bains et al. |
| 7,386,575 B2* | 6/2008 | Bashant et al. ............... 707/201 | 2005/0144399 A1 | 6/2005 | Hosomi ....................... 711/145 |
| 7,418,526 B2 | 8/2008 | Jeddeloh | 2005/0149665 A1 | 7/2005 | Wolrich et al. |
| 7,421,525 B2 | 9/2008 | Polzin et al. | 2005/0166006 A1* | 7/2005 | Talbot et al. ................. 711/105 |
| 7,433,258 B2 | 10/2008 | Rao et al. | 2005/0177677 A1 | 8/2005 | Jeddeloh |
| 2001/0000822 A1 | 5/2001 | Dell et al. .................... 711/170 | 2005/0177690 A1 | 8/2005 | LaBerge ...................... 711/154 |
| 2001/0003839 A1 | 6/2001 | Kondo ......................... 711/144 | 2005/0204216 A1 | 9/2005 | Daily et al. .................. 714/724 |
| 2001/0029566 A1 | 10/2001 | Shin | 2005/0216678 A1 | 9/2005 | Jeddeloh |
| 2002/0019926 A1 | 2/2002 | Huppenthal et al. ........... 712/15 | 2005/0220097 A1 | 10/2005 | Swami et al. |
| 2002/0038405 A1 | 3/2002 | Leddige et al. .............. 711/115 | 2005/0223196 A1 | 10/2005 | Knowles |
| 2002/0059439 A1 | 5/2002 | Arroyo et al. | 2005/0229132 A1 | 10/2005 | Butt et al. ...................... 716/10 |
| 2002/0083255 A1 | 6/2002 | Greeff et al. ................. 710/305 | 2005/0248997 A1 | 11/2005 | Lee |
| 2002/0103988 A1 | 8/2002 | Dornier ......................... 712/38 | 2005/0257005 A1 | 11/2005 | Jeddeloh |
| 2002/0112119 A1 | 8/2002 | Halbert et al. ............... 711/115 | 2005/0259496 A1 | 11/2005 | Hsu et al. ..................... 365/226 |
| 2002/0112194 A1 | 8/2002 | Uzelac ......................... 713/500 | 2005/0289292 A1 | 12/2005 | Morrow et al. |
| 2002/0124195 A1 | 9/2002 | Nizar .......................... 713/320 | 2005/0289377 A1 | 12/2005 | Luong |
| 2002/0124201 A1 | 9/2002 | Edwards et al. | 2006/0036826 A1 | 2/2006 | Dell et al. |
| 2002/0147898 A1 | 10/2002 | Rentschler et al. ........... 711/170 | 2006/0036827 A1 | 2/2006 | Dell et al. |
| 2002/0174274 A1 | 11/2002 | Wu et al. ..................... 710/100 | 2006/0080584 A1 | 4/2006 | Hartnett et al. |
| 2003/0009632 A1 | 1/2003 | Arimilli et al. | 2006/0085602 A1 | 4/2006 | Huggahalli et al. |
| 2003/0028701 A1 | 2/2003 | Rao et al. | 2006/0095592 A1 | 5/2006 | Borkenhagen |
| 2003/0033364 A1 | 2/2003 | Garnett et al. ............... 709/203 | 2006/0095679 A1 | 5/2006 | Edirisooriya |
| 2003/0051055 A1 | 3/2003 | Parrella et al. | 2006/0107175 A1 | 5/2006 | Dell et al. |
| 2003/0056183 A1 | 3/2003 | Kobayashi | 2006/0112238 A1 | 5/2006 | Jamil et al. |
| 2003/0084309 A1 | 5/2003 | Kohn ........................... 713/189 | 2006/0161733 A1 | 7/2006 | Beckett et al. |
| 2003/0090879 A1 | 5/2003 | Doblar et al. ................ 361/728 | 2006/0162882 A1* | 7/2006 | Ohara et al. ................. 162/158 |

| | | |
|---|---|---|
| 2006/0168407 A1 | 7/2006 | Stern |
| 2006/0179208 A1* | 8/2006 | Jeddeloh .................... 711/100 |
| 2006/0190674 A1* | 8/2006 | Poechmueller ............. 711/103 |
| 2006/0195631 A1 | 8/2006 | Rajamani |
| 2006/0206742 A1* | 9/2006 | James ....................... 713/503 |
| 2006/0212666 A1 | 9/2006 | Jeddeloh |
| 2006/0224764 A1 | 10/2006 | Shinohara et al. |
| 2006/0277365 A1* | 12/2006 | Pong ......................... 711/128 |
| 2006/0288172 A1 | 12/2006 | Lee et al. |
| 2007/0005922 A1 | 1/2007 | Swaminathan et al. |
| 2007/0025304 A1 | 2/2007 | Leelahakriengkrai et al. |
| 2007/0038907 A1 | 2/2007 | Jeddeloh et al. |
| 2007/0067382 A1 | 3/2007 | Sun |
| 2007/0083701 A1 | 4/2007 | Kapil |
| 2008/0043808 A1 | 2/2008 | Hsu et al. |
| 2008/0162807 A1 | 7/2008 | Rothman et al. |
| 2008/0222379 A1* | 9/2008 | Jeddeloh .................... 711/167 |

FOREIGN PATENT DOCUMENTS

| | | |
|---|---|---|
| EP | 0470734 | 2/1992 |
| EP | 0899743 A2 | 6/1998 |
| EP | 1429340 A2 | 6/2004 |
| GB | 2396711 A | 6/2004 |
| JP | 59153353 A | 9/1984 |
| JP | 0114140 A | 6/1989 |
| JP | 0432614 | 11/1992 |
| JP | 10011971 | 1/1998 |
| JP | 2004139552 A | 5/2004 |
| JP | 2008003711 A | 1/2008 |
| WO | 9621188 | 7/1996 |
| WO | 9812651 | 3/1998 |
| WO | 0223353 A2 | 3/2002 |
| WO | WO2005038660 | 4/2005 |
| WO | 2007109888 | 10/2007 |

OTHER PUBLICATIONS

PCT International Search Report PCT/EP2007/057916. Mailed Dec. 14, 2007.

Boudon, et al., "Novel Bus Reconfiguration Scheme With Spare Lines", IBM Technical Disclosure Bulletin, May 1987, vol. 29, No. 12, pp. 1-3.

NB940259 (IBM Technical Disclosure Bulletin, Feb. 1994; vol. 37; pp. 59-64).

Singh, S., et al., "Bus Sparing for Fault-Tolerant System Design", IBM Technical Disclosure Bulletin, Dec. 1991, vol. 34, No. 71, pp. 117-118.

U.S. Appl. No. 11/419,586, filed May 22, 2006. Robert Tremaine. "Systems and Methods for Providing Remote Pre-Fetch Buffers".

Wikipedia, Serial Communications, [online], [retrieved Apr. 10, 2007 from the Internet], http://en.wikipedia.org/wiki/Serial_communications, 3 pages.

Sivencrona et al.; "RedCAN™: Simulations of two Fault Recovery Algorithms for CAN;" Proceedings for the 10th IEEE Pacific Rim International Symposium on Dependable Computing (PRDC'04); 2005.

Jungjoon Kim et al.; "Performance and Architecture Features of Segmented Multiple Bus System;" IEEE Computer Society; 1999 International Conference on Parallel Processing (ICPP '99).

Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.

Seceleanu et al.; "Segment Arbiter as Action System;" IEEE 2003 pp. 249-252.

Understanding System Memory and CPU Speeds: A Layman's Guide to the Front Side Bus (FSB), [online]; [retrieved on Feb. 23, 2006]; retrieved from the Internet http://www.directron.com/fsbguide.html.

JEDEC Solid State Technology Association, "JEDEC Standard: DDR2 SDRAM Specification", Jan. 2004, JEDEC, Revision JESD79-2A, p. 10.

Brown, et al "Compiler-Based I/O Prefetching for Out-of-Core Applications", ACM Transactions on Computer Systems, vol. 19, No. 2, May 2001, pp. 111-170.

Wang, et al., "Guided Region Prefetching: A Cooperative Hardware/Software Approach", pp. 388-398.

Natarajan, et al., "A Study of Performance Impact of Memory Controller Features in Multi-Processor Server Environment", pp. 80-87.

Nilsen, "High-Level Dynamic Memory Management for Object-Oriented Real-Time Systems", pp. 86-93.

Massoud Pedram, "Power Minimization in IC Design Principles and Applications", ACM Transactions on Design Automation of Electronic Systems vol. 1, No. 1, Jan. 1996, pp. 3-56.

P.R. Panda, "Data and Memory Optimization Techniques For Embedded Systems", ACM Transactions on Design Automation of Electronic Systems, vol. 6, No. 2, Apr. 2001, pp. 149-206.

Luca Benini, et al., "System-Level Powers Optimization: Techniques and Tools", ACM Transactions on Design Automation of Electronic Systems, vol. 5, No. 2, Apr. 2000, pp. 115-192.

International Search Report, International Application No. PCT/EP2007/054929, International Publication No. WO 2007/135144 A1, received Mar. 21, 2008.

IEEE, "IEEE Standard Test Access Port and Boundary-Scan Architecture", Jul. 23, 2001, IEEE Std 1149-1-2001, pp. 11-13.

Rosenberg, "Dictionary of Computers, Information Processing & Telecommuications", Second Edition, John Wiley & Sons, Inc. 1987. 3 pgs.

Joe Jeddeloh, Fully Buffered DIMM (FB-DIMM), XP002490174, Advanced Systems Technology, Micron Technology, Inc. Apr. 16, 2008, 32 pages.

Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.

"Using Dual and Mappable Spare Bus", XP000433763, IBM Technical Disclosure Bulletin, vol. 37, No. 2B, IBM Copr., NY, US, Feb. 1, 1994, pp. 59-63.

"Novel Bus Reconfiguration Scheme With Spare Lines", XP000676205, IBM Technical Disclosure Bulletin, vol. 29, No. 12, IBM Copr., NY, US, May 12, 1987, pp. 5590-5593.

European Search Report, European Patent Application 05106700.7, received Aug. 11, 2008.

International Search Report, International Patent Application No. PCT/US07/75944, mailed Sep. 23, 2008, 3 pages.

European Search Report, European Patent Application No. 05106701.5, mailed Oct. 7, 2008, 5 pages.

European Search Report, European Patent Application No. 05109837.4, mailed Oct. 7, 2008, 5 pages.

PCT Search Report. PCT/EP2007/057915. Mailed Nov. 7, 2007.

Yang, Q.; Bhuyan, L.N., "Analysis of packet-switched multiple-bus multiprocessor systems," Computers, IEEE Transactions on, vol. 40, No. 3, pp. 352-357, Mar. 1991.

Li, P; Martinez, J.; Tang, J.; Priore, S.,; Hubbard, K.; Jie Xue; Poh, E.; Ong MeiLin; Chok KengYin; Hallmark, C.; Mendez, D.; "Development and evaluation of a high performance fine pitch SODIMM socket package." Electronic Components and Technology Conference, 2004. Proceedings. 54th, vol. 1, pp. 1161-1166, Jun. 1-4, 2004.

Nilsen, "High-Level Dynamic Memory Management for Object-Oriented Real-Time Systems", Jan. 1, 1996, pp. 86-93.

Wang, et al., "Guided Region Prefetching: A Cooperative Hardware/Software Approach", Jun. 2003, pp. 388-398.

Natarajan, et al., "A Study of Performance Impact of Memory Controller Features in Multi-Processor Server Environment", WMPI, Jun. 2004, pp. 80-87.

* cited by examiner

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|
| ary0A | R0 | | R1 | | Cr0 | | Cr1 | | | | R2 | Cw0 | R3 | Cw1 | Cr2 | | Cr3 | | | | | Cw2 | | Cw3 | | | | | |
| ary0D | | | | | | | | | | Dr0 | Dr1 | | | | Dw0 | Dw0 | Dw1 | Dw1 | | Dr2 | Dr2 | Dr3 | Dr3 | | Dw2 | Dw2 | Dw3 | Dw3 | |

FIG. 8

ONE INDEPENDENT 8B-WIDE MEMORY ARRAY OR ONE HUB ON ONE
OF "N" MEMORY HUB CHIP MEMORY DEVICE CHANNELS

SYSTEMS AND METHODS FOR PROVIDING DATA MODIFICATION OPERATIONS IN MEMORY SUBSYSTEMS

GOVERNMENT RIGHTS

This invention was made with Government support under subcontract NBCH3039004 awarded by the Defense Advanced Research Projects Agency (DARPA). The Government has certain rights in this invention.

BACKGROUND OF THE INVENTION

This invention relates generally to memory controllers and memory hub devices, and more particularly to systems and methods for providing data modification operations in memory hub devices.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-before-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 10 which includes a synchronous memory module 20 that is directly (i.e. point-to-point) connected to a memory controller 14 via a bus 40, and which further includes logic circuitry 24 (such as an application specific integrated circuit, or "ASIC") that buffers, registers or otherwise acts on the address, data and control information that is received from the memory controller 14. The memory module 20 can be programmed to operate in a plurality of selectable or programmable modes by way of an independent bus, such as an inter-integrated circuit (I2C) control bus 34, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. No. 5,513,135, U.S. Pat. No. 6,173,382 further demonstrates the capability of integrating all of the defined functions (address, command, data, presence detect, etc) into a single device. The integration of functions is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 10 that includes up to four registered DIMMs 40 on a traditional multi-drop stub bus. The subsystem includes a memory controller 20, an external clock buffer 30, registered DIMMs 40, an address bus 50, a control bus 60 and a data bus 70 with terminators 95 on the address bus 50 and the data bus 70. Although only a single memory channel is shown in FIG. 3, systems produced with these modules often included more than one discrete memory channel from the memory controller, with each of the memory channels operated singly (when a single channel was populated with modules) or in parallel (when two or more channels where populated with modules) to achieve the desired system functionality and/or performance.

FIG. 4, from U.S. Pat. No. 6,587,912 to Bonella et al., depicts a synchronous memory module 210 and system structure in which the repeater hubs 320 include local re-drive of the address, command and data to the local memory devices 301 and 302 via buses 321 and 322; generation of a local clock (as described in other figures and the patent text); and the re-driving of the appropriate memory interface signals to the next module or component in the system via bus 300.

FIG. 5 illustrates a computing system comprised of: a processor chip 500 with an integrated memory controller 510 and a cache 512; and one or more memory subsystems (also referred to as memory modules) 503 that include one or more memory hub devices 504 each connected to one or more DRAM devices 509. Each memory subsystem 503 is associated with a memory channel that is connected to the integrated processor chip 500 through a cascade interconnect bus structure for the highest performance at the lowest cost. The memory controller(s) 510 are interconnected to memory hub devices 504 via one or more physical high speed bus(es) 506. Each hub device 504 provides one or more low speed independent connection(s) to groups of DRAM devices 509 following, for example, the fully buffered DIMM standard. Multiple (typically 2 or 4) identically configured physical networks 508 of memory modules are logically grouped together into module groups 501 and 502, and operated on in unison by the memory controller 510 to provide for optimal latency, bandwidth, and error correction effectiveness for system memory cache line transfer (typically 64B or 128B). However, a commonly assigned U.S. patent application Ser. No. 11/464,503, entitled SYSTEMS AND METHODS FOR PROGRAM DIRECTED MEMORY ACCESS PATTERNS, filed on Aug. 15, 2006, provides the means to have logical networks of hubs dynamically associated and de-associated for specific addresses based on software hints.

The memory controller 510 translates system requests for memory access into packets according to a memory hub communication protocol. Memory write packets contain at least a command, address, and associated data. Memory read packets contain at least a command and address. Memory read packets imply an expected packet will be returned which contains the requested data.

FIG. 6 depicts a block diagram of a memory hub device 504 including a link interface 604 for providing the means to re-synchronize, translate and re-drive high speed memory access information to associated DRAM devices 509 and/or to re-drive the information downstream on memory bus 506 as applicable based on the memory system protocol. The information is received by the links interface 604 from an upstream memory hub device 504 or from a memory controller 510 (directly or via an upstream memory hub device controller 504) via the memory bus 506. The memory device data interface 615 manages the technology-specific data interface with the memory devices 509 and controls the bidirectional memory data bus 608. The memory hub control 613 responds to access request packets by responsively driving the memory device 509 technology-specific address and control bus 614 and directing the read data flow 607 and write data flow 610 selectors. The link interface 604 decodes the packets and directs the address and command information directed to the local hub device 504 to the memory hub control 613. Memory write data from the link interface 604 can be temporarily stored in the write data queue 611 or directly driven to the memory devices 509 via the write data flow selector 610 and internal bus 612, and then sent via internal bus 609 and memory device data interface 615 to memory device data bus 608. Memory read data from memory device(s) 509 can be queued in the read data queue 606 or directly transferred to the link interface 604 via internal bus 605 and read data selector 607, to be transmitted on the upstream bus 506 as a read reply packet.

Processor updates to memory (write operations) at a granularity smaller than a cache line are merged in the cache 512, which is located in the integrated processor chip 500, requiring the processor to initiate a request access to the cache 512. Responsively, the cache 512 requests the memory controller 510 to read the cache line from main memory, and the memory controller 510 initiates a memory read command to the memory hub device(s), 504 and the memory hub device(s) 504 forward the read command to the memory devices 509. The memory devices 509 reply with the data comprising the cache line, and the data is propagated back to the cache 512 where the processor "write" data is then merged to complete the read-modify-write operation. In one caching convention, the updated cache line is eventually written back to the main memory after it is replaced by a higher value cache line, although the cache line may also be immediately written to the main memory or follow another caching convention. The throughput for this cache line data merge is limited by the number of pending cache line merges that can be supported by the processor chip 500/cache 512, among other factors. The described process works well when the cache line is referenced multiple times and/or when there are relatively few sub cache line granularity memory updates.

Certain computational algorithms result in significant volumes of memory updates at sub-cache line granularity. Moreover, these updates can be to random records in a large database, resulting in little or no reuse of the cache line. In this case, the computer system throughput can be limited to the number of pending merge buffers associated with the cache 512, leading to an effective main memory bandwidth utilization of only a few percent. Having processor sub-cache line granularity memory write requests bypass the caches 512 for execution by the main memory controller 510, by a process of reading the cache line from main memory, merging the write data and writing updated cache line data back to the main memory is also inefficient due to the transfer of un-needed data and commands through the bus(es) 506 to the memory subsystems 503 and associated hub devices 504. Therefore, a need exists for having sub-cache line memory updates executed efficiently and reliably in systems that employ memory hub devices 504.

BRIEF SUMMARY OF THE INVENTION

Embodiments include a memory system for storing and retrieving data for a processing system. The memory system includes a plurality of memory devices, a memory controller, one or more memory busses connected to the memory controller and a memory hub device. The memory controller receives and responds to memory access requests including memory update requests from a processor. The memory controller also generates a memory update command in response to receiving a memory update request. The memory hub device includes a first port, a second port and a control unit. The first port is in communication with the memory controller via one or more of the memory busses for transferring data and control information between the memory hub device and the memory controller. The second port is in communication with one or more of the memory devices. The control unit decodes the memory update command from the data and control information and accesses the memory devices via the second port to perform the memory update command local to the memory hub devices as a logical read-modify-write sequence.

Further embodiments include a memory subsystem for storing and retrieving data for a processing system. The memory subsystem includes a plurality of memory devices and a memory hub device. The memory hub device includes a first port, a second port and a control unit. The first port is in communication with a memory controller via one or more memory busses for transferring data and control information between the memory hub device and the memory controller. The second port is in communication with one or more of the memory devices. The control unit decodes the memory update command from the data and control information and accesses the memory devices via the second port to perform the memory update command local to the memory hub devices as a logical read-modify-write sequence.

Further embodiments include a memory hub device with a first port, a second port and a control unit. The first port is in communication with a memory controller via one or more memory busses for transferring data and control information between the memory hub device and the memory controller. The second port is in communication with one or more of the memory devices. The control unit decodes the memory update command from the data and control information and accesses the memory devices via the second port to perform the memory update command local to the memory hub device as a logical read-modify-write sequence.

Still further embodiments include a method for executing a memory command. The method includes receiving a memory update command including an address and update data from a memory controller. The memory update command is received via one or more memory busses at a memory hub device that includes two or more ports. One or more memory devices associated with the address is accessed. The memory update command is performed on the memory devices as a logical read-modify-write sequence. The memory update command is performed local to the memory hub device in response to the update data.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 8 is a block diagram of a sequence of operations associated with sub-cache line access that may be implemented by exemplary embodiments.

DETAILED DESCRIPTION OF EXEMPLARY EMBODIMENTS

The high speed memory bus that interconnects memory controller(s) with one or more hub devices in a cascade interconnect system often provides a lower access bandwidth to the array of memory devices than that which is afforded by the memory devices themselves. This may be due to bus contention with other module traffic, bus speed and signaling limitations, bus communication (i.e. packet) overhead, limited bus width and other affects. Exemplary embodiments provide the means to exploit the aggregate memory device bandwidth in a system for servicing memory accesses, specifically sub-cache line memory writes or updates (i.e., sub-cache line operations). Conventional hub devices serve as conduits for memory data and control traffic associated with operations such as cache line transfers to and from memory, and exemplary embodiments extend the capability of the hub device(s) to perform specific operations on memory data, local to the memory subsystem.

As used herein, the term sub-cache line access refers to a memory access (e.g., a write operation) having a granularity smaller than the smallest unit of memory that can be transferred between the main memory and the cache. From a memory system standpoint, the data width times the burst length is ideally the same as a cache line (e.g., a data width of 8 bytes times a burst of 8 equals 64 bytes of data, which might represent an ideal memory structure to support a cache line of 64 bytes) and/or the conventional memory system access granularity (e.g., 64 bytes, 128 bytes). A memory write operation to an 8 byte data field (e.g. one-eighth of a cache line) would therefore represent a 'sub-cache line access', in that the 8 byte access granularity would be smaller than the smallest unit of memory (in this example, 64 bytes) that can be transferred between the main memory and the cache.

Figure 1:
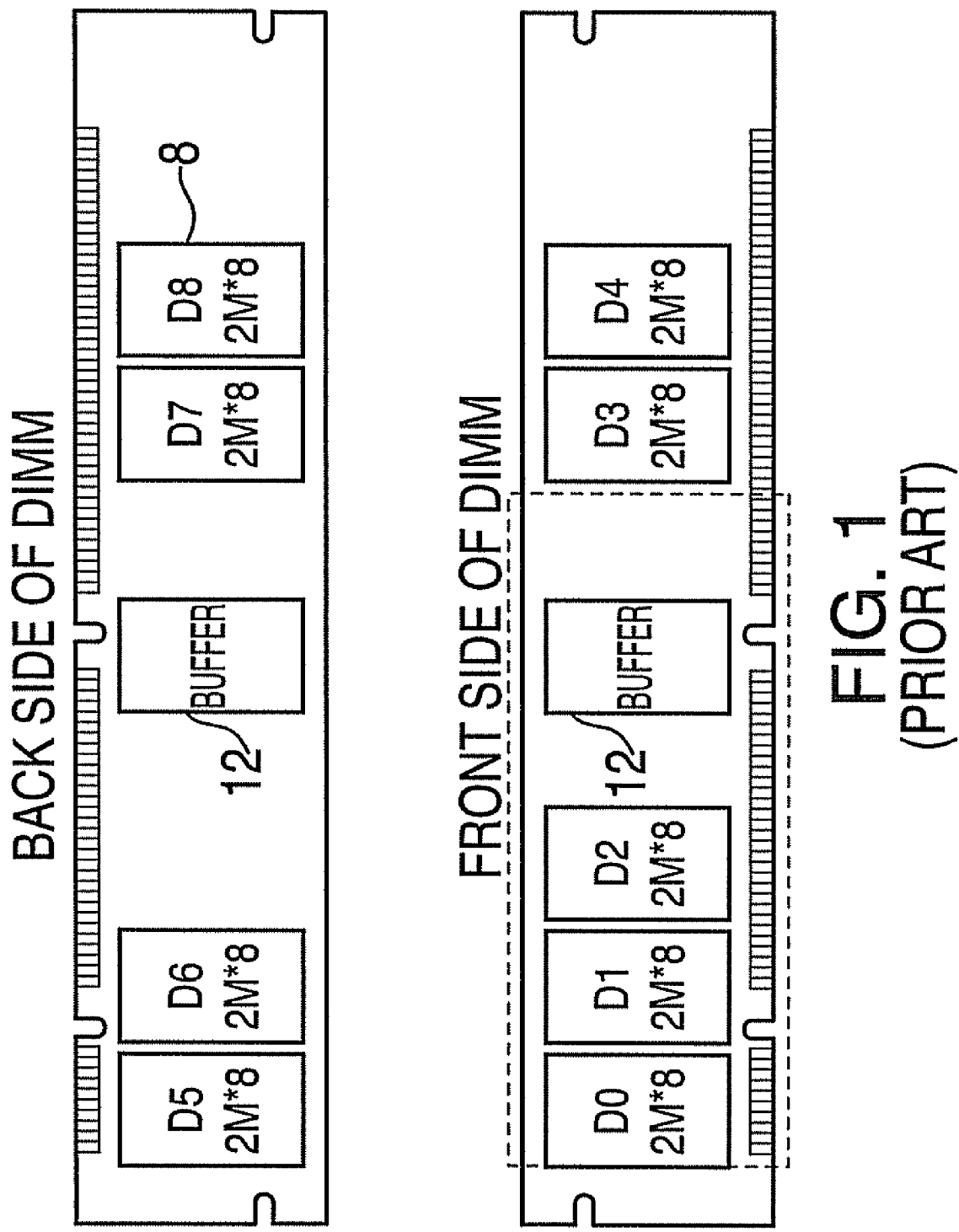
FIG. 1 depicts an exemplary early synchronous memory module.
Figure 2:
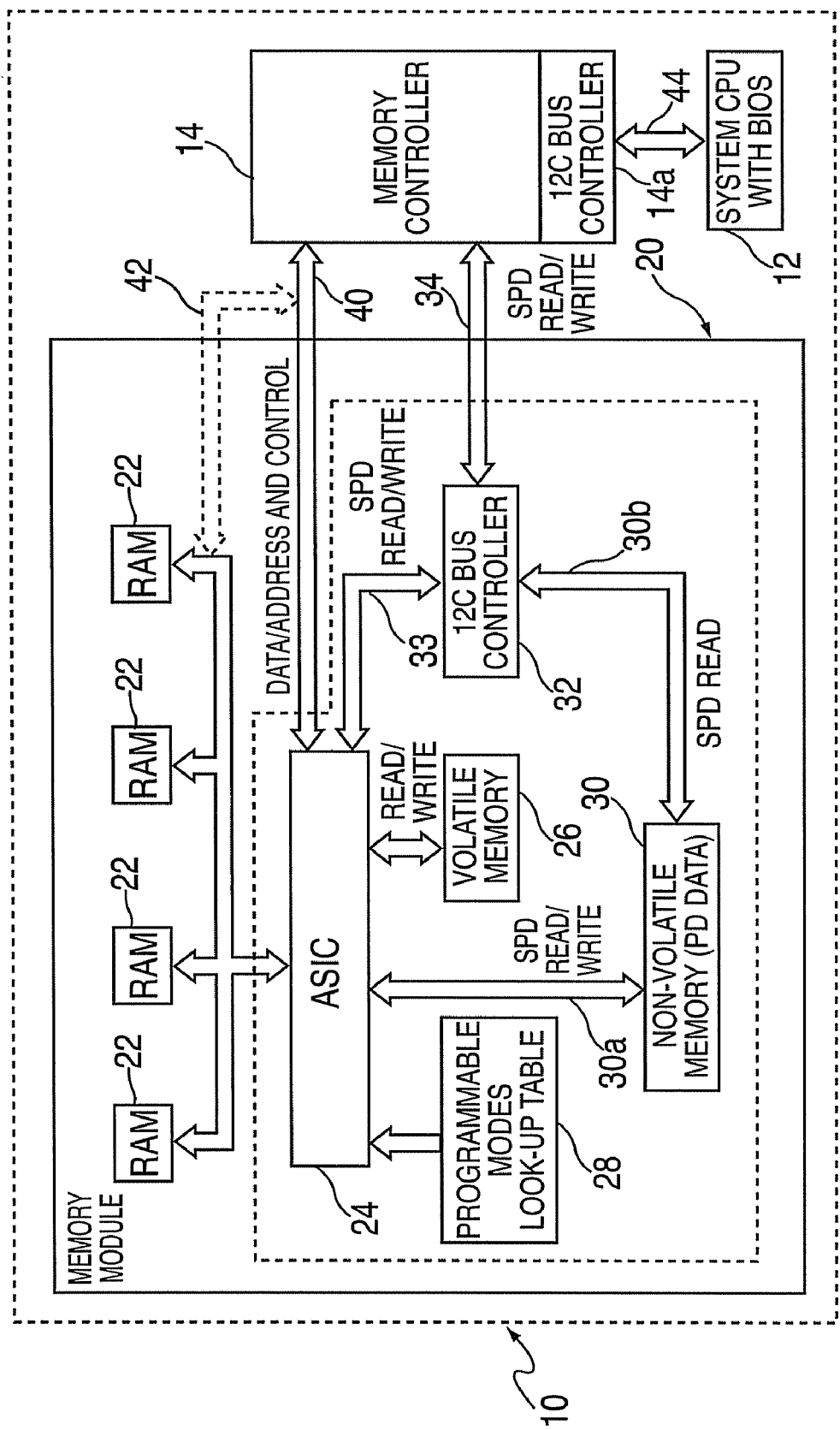
FIG. 2 depicts an exemplary computer system with a filly buffered synchronous memory module that is directly connected to a memory controller.
Figure 3:
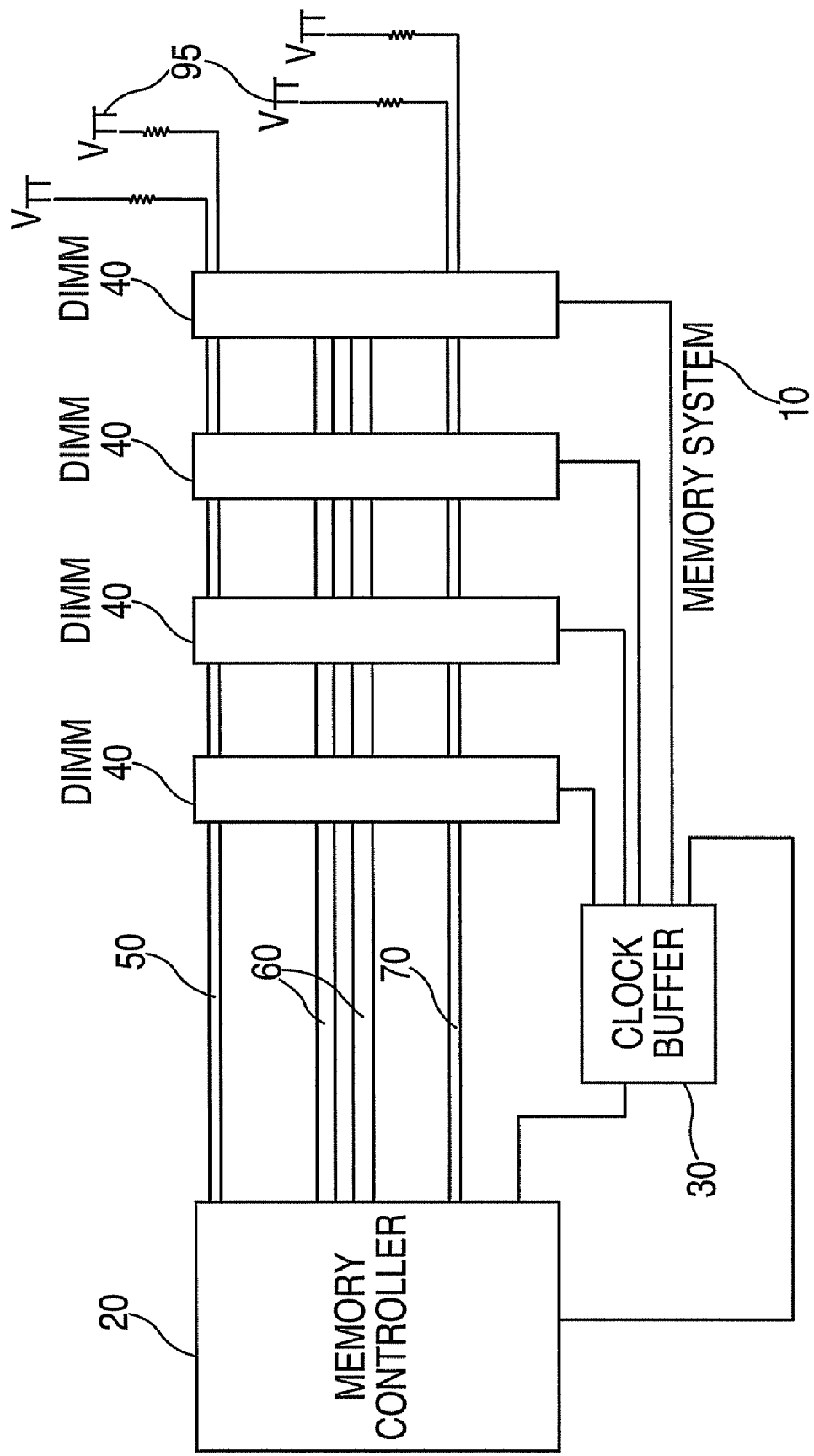
FIG. 3 depicts an exemplary memory system, shown with a single, traditional multi-drop stub bus.
Figure 4:
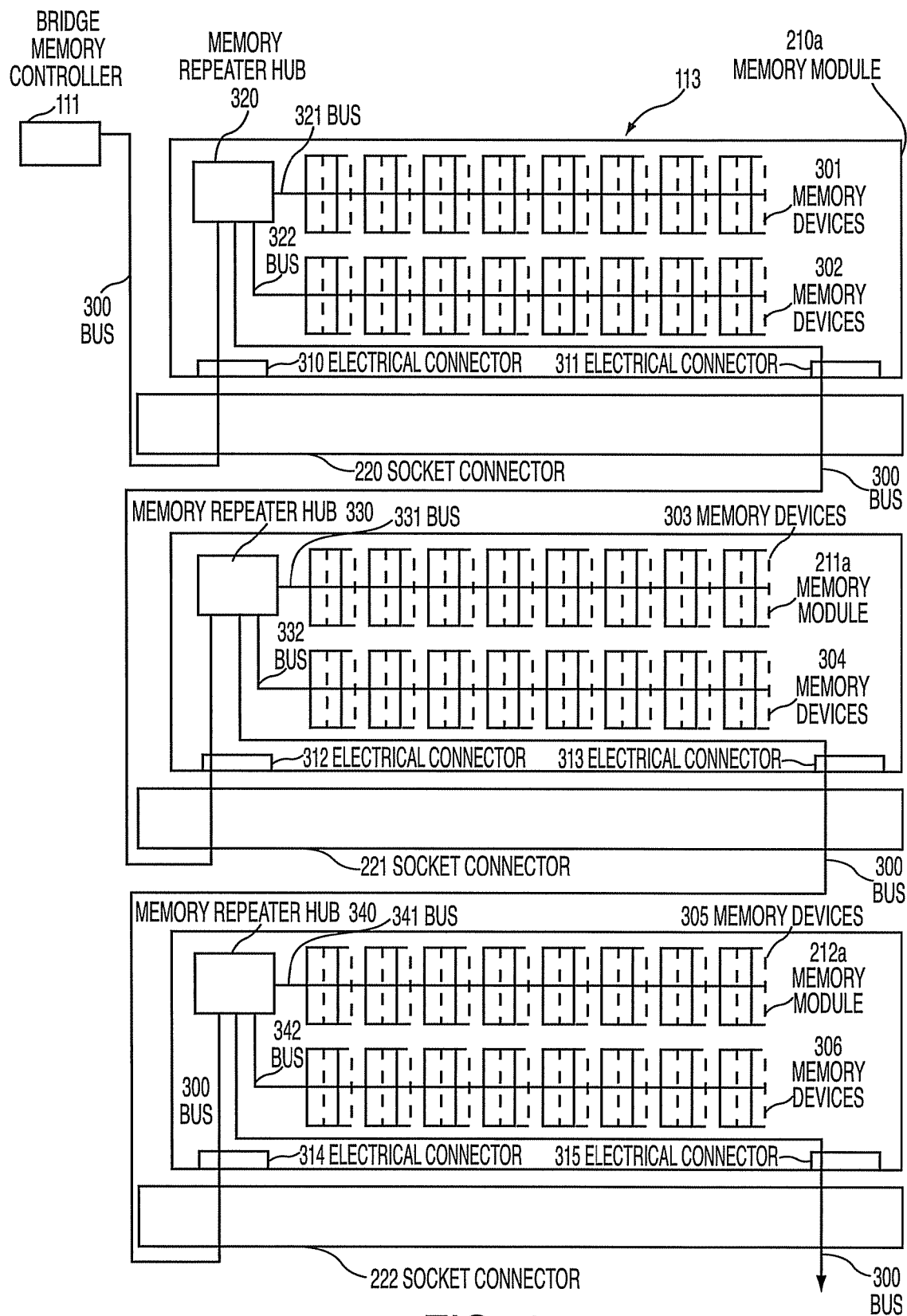
FIG. 4 depicts a filly buffered synchronous memory module and system structure, where the filly buffered synchronous memory module includes a repeater function.
Figure 5:
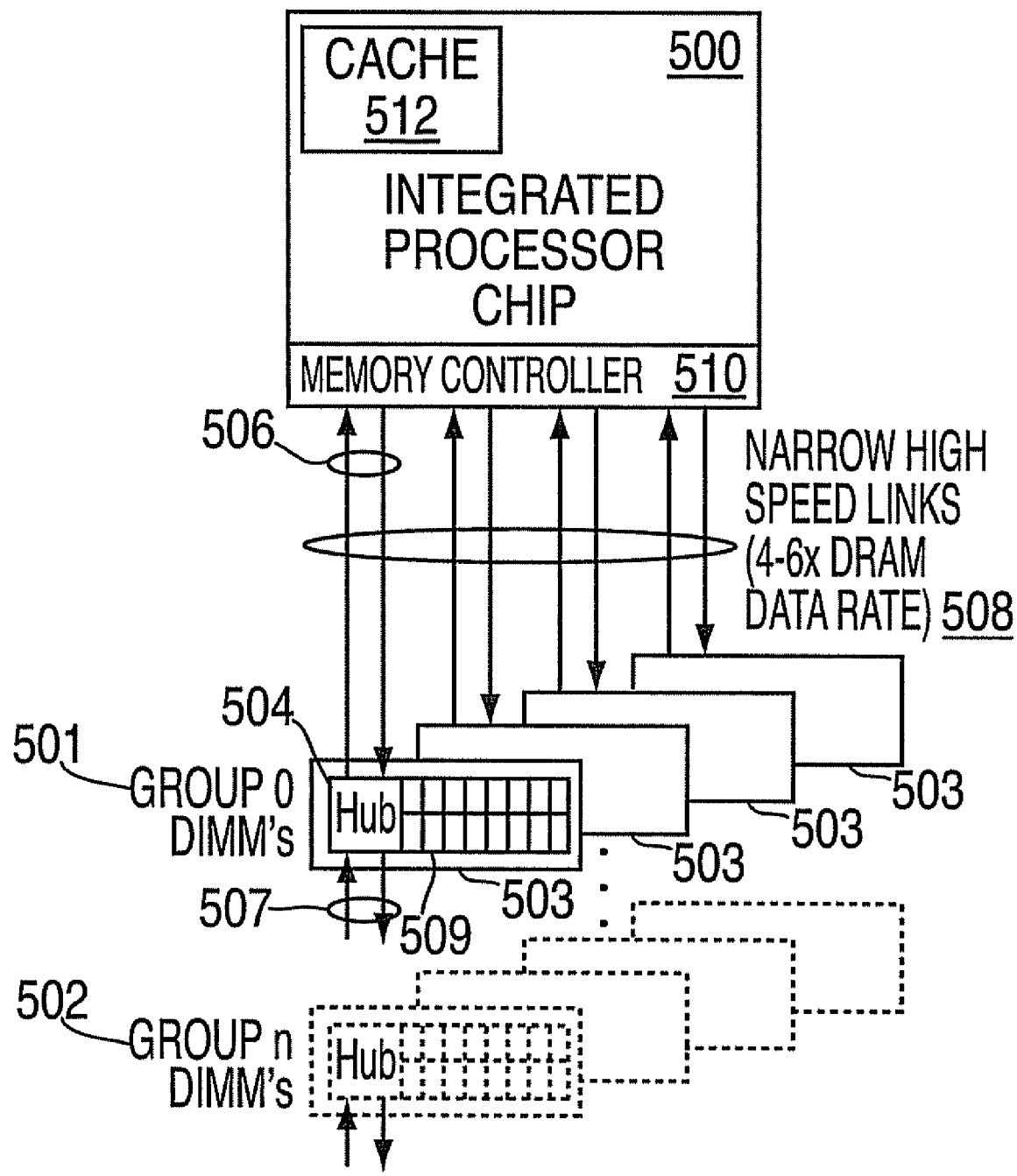
FIG. 5 depicts a block diagram of multiple independent daisy-chained memory interface channels that operate in parallel to support data access requests.
Figure 6:
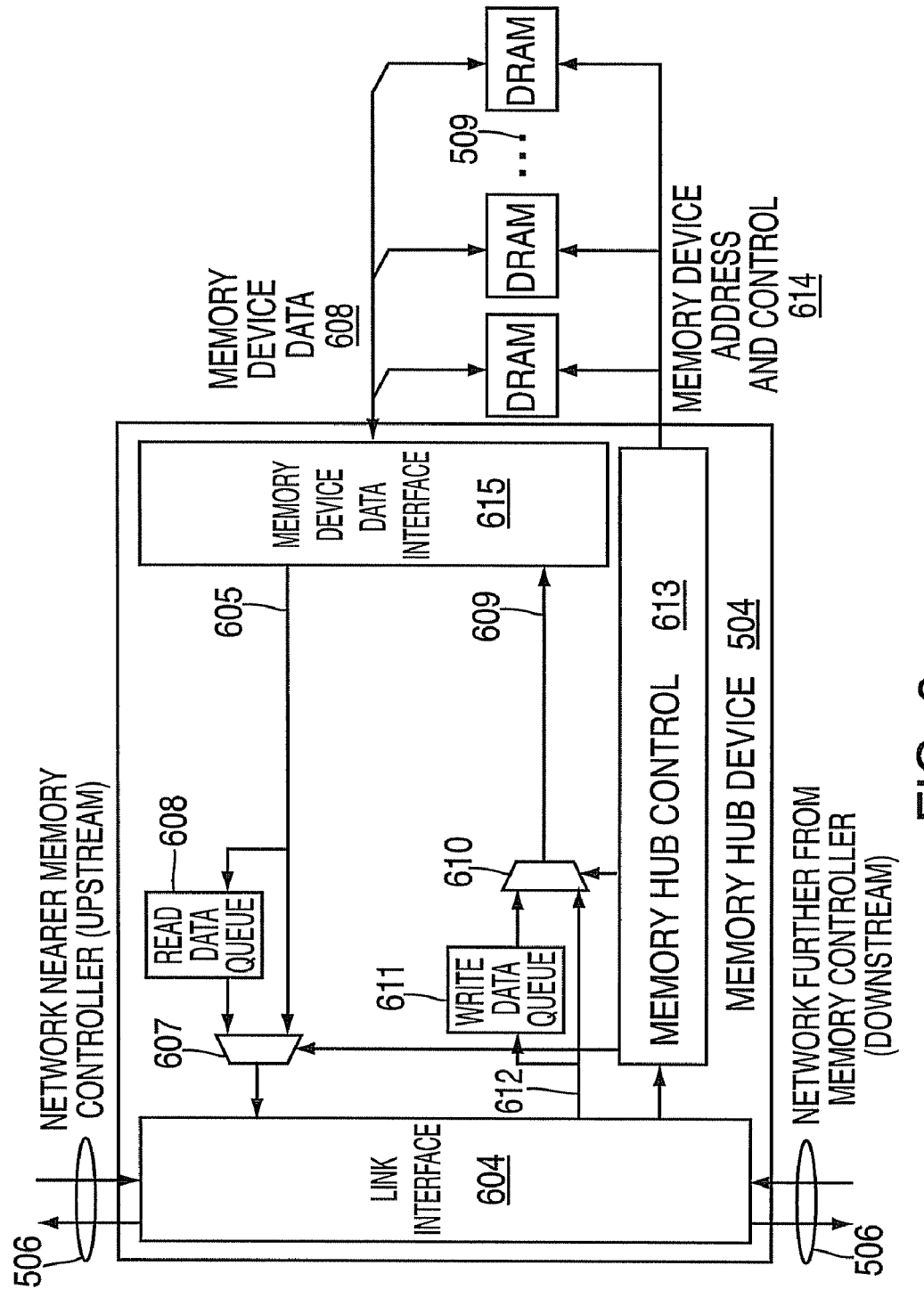
FIG. 6 depicts a memory hub device.
Figure 7:
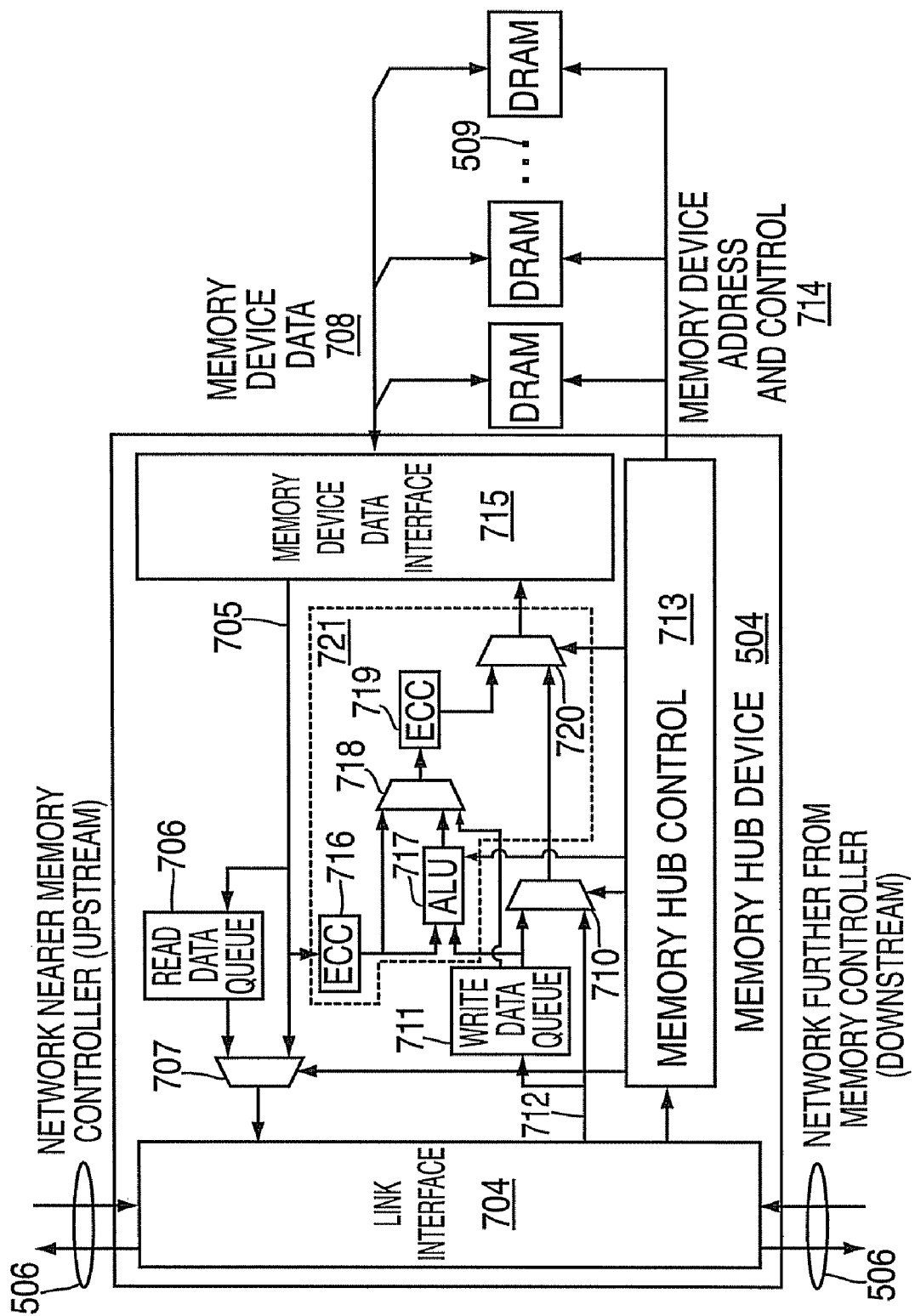
FIG. 7 depicts a memory hub device including circuitry to perform data modification operations that may be implemented by exemplary embodiments.

FIG. 7 illustrates a memory hub device 504 that may be implemented by exemplary embodiments. In exemplary embodiments, the hub device 504 is located in a memory subsystem, or memory module. The hub device 504 depicted in FIG. 7 is similar to the hub device 504 depicted in FIG. 6 (and performs the functions described in reference to FIG. 6), but also includes a modify pipeline 721, an improved link interface 704 and an improved memory hub control 713. The improved link interface 704 decodes a command packet received from the bus 506 and the improved memory hub control 713 further decodes the command packet to determine the operation to be completed. In exemplary embodiments, one or more commands will identify specific operations to be applied to memory data. In exemplary embodiments, the bus 506 is implemented by a unidirectional upstream bus and a unidirectional downstream bus. In alternate exemplary embodiments, the bus is implemented by a single bidirectional bus. The functions performed by the memory hub device 504 depicted in FIG. 7 may be implemented by software and/or hardware.

The following two groups of memory update commands are examples of operations that can be completed within a memory subsystem produced with an exemplary memory hub control device 504. Memory update commands that do not imply reply data from the main memory to the processor may include, but are not limited to:

Fetch and write operand
Fetch and ADD operand
Fetch and SUBTRACT operand
Fetch and logical OR with operand
Fetch and logical AND with operand
Fetch and logical XOR with operand
Fetch and logical NOT with operand
Fetch and logical CLEAR to zero
Fetch and logical bit SHIFT LEFT (0 or 1 fill) by operand
Fetch and logical bit SHIFT RIGHT (0 or 1 fill) by operand
Fetch and logical bit ROTATE by operand Additional memory update commands that do imply reply data from the main memory to the processor may include, but are not limited to:

Fetch and ADD operand and reply with result
Fetch and SUBTRACT operand and reply with result
Fetch and SET with operand when clear and reply with read data Both groups of memory update commands described above are also referred to herein as read-modify-write (RMW) commands. These RMW commands may be performed local to the hub device 504 (i.e., without requiring processor chip 500 or memory controller 510 intervention).

Referring to FIG. 7, the inclusion of an arithmetic logic unit (ALU) 717 in the modify pipeline 721 provides the means to operate on the memory read data for memory update commands such as those listed above.

Preserving data integrity through error correction and detection in the memory controller 510 is impractical when memory updates are completed in the memory hub device(s) 504, as the write data is developed local to the hub device 504, and is dependent on the read data associated with that address range. Exemplary embodiments incorporate in the memory hub device 504 an error detection and correction (EDC) check and correct block 716 to detect and correct data errors on read data based on EDC codes (also referred to as Error Correction codes (ECC)) incorporated with the read data. Further, an EDC code generation block 719 generates EDC codes for the write data. In exemplary embodiments, the EDC coding scheme is based on 8-byte data words in hub devices that support a single 8-byte wide memory device interface. In further exemplary embodiments, the EDC coding scheme is based on either 8-byte data words or 16-byte data words in hub devices 504 that support two 8-byte wide memory device interfaces. Any EDC coding algorithm may be utilized by exemplary embodiments, and several are currently known in the art. In a second mode of operation, the dataflow may selectively bypass the EDC check and correct block 716 and/or the EDC code generation block 719 when a latency advantage exists and/or when this level of data integrity is not required. In a third mode of operation, exemplary embodiments may include a parallel EDC data pipeline capable of detecting data errors late and responsively aborting a memory writeback and/or indicating error in a data reply packet and/or re-running one or more operation(s) responsive to detecting a data error late in the execution process. In addition to or instead of using EDC as a means of maximizing data integrity, other modes or combinations of modes such as parity, CRC (cyclic redundancy check), complement/re-complement, memory access re-try, etc may be utilized in the hub device, without departing from the scope of the invention.

The system is most effective when independent update command streams are directed to each hub device 504 such that each hub device 504 can have one or more independent memory update operation(s) pending to one or more independent address(es). Moreover, a commonly assigned U.S. patent application Ser. No. 11/464,503, entitled SYSTEMS AND METHODS FOR PROGRAM DIRECTED MEMORY ACCESS PATTERNS, filed on Aug. 15, 2006, provides the means for a memory system comprised of two or more memory channels to utilize one or more busses, on a cycle by cycle basis, based on access "hint" information. The referenced application provides a means by which a memory system can accommodate accesses to a subset of the available memory channels, which complements the exemplary embodiment by permitting simultaneous independent operations, such as data modification operations in a memory subsystem.

Memory update commands received from the link interface 704 will include data or an operand as data (except for operands such as a "fetch and logical clear"), and the data is stored in the write data queue 711 via data path 712, for subsequent transfer to the ALU 717. Alternative exemplary embodiments employ a separate update command data queue that is independent of the write data queue (shown as block 611 in FIG. 6). Referring to FIG. 7, new memory update commands are serviced by the memory hub control 713 to memory devices 509 as a sequence of operations that correlate to a RMW operation. If a RMW operation is not supported by a memory device technology being utilized, a sequence of read and write operations will be performed that provide the same function. In exemplary embodiments, a sub-cache line operation commences with a conventional read access to the memory devices 509, using the smallest 'minimum burst length' (typically 4 or 8 consecutive 8-byte transfers) supported by the memory devices 509. The read data stream from the memory devices 509 is received by the memory data interface 715 and is acted upon by the modify pipeline 721, with the updated data sent back to the memory devices 509 via memory device interface 715 as a burst write to the same address range.

Although not shown, alternative embodiments including having the data streamed through the modify pipeline 721 to the write data queue 711 (or an alternate temporary storage location), to delay or accumulate one or more write operation(s) before writing back to the memory devices 509. This method may further improve overall memory subsystem performance by grouping multiple reads and multiple write accesses to reduce the bidirectional data bus 708 turn-around overhead.

Referring to the embodiment depicted in FIG. 7, the read data stream from the memory devices 509 is received by the memory device data interface 715, and the information is passed to the EDC check and correct block 716, where the data is checked and may be corrected if one or more errors are identified. The read data is then directed to the ALU 717 and the read selector MUX 718, with the memory hub control 713 determining the correct path based on the decode of the command(s) that initiated the read operation as received by link interface 704. The read selector MUX 718 passes the updated data to the EDC code generation block 719. The updated data includes the output of the EDC check and correct block 716 merged with the sub-cache line data from the write data queue 711. Alternatively, the updated data includes the data from the EDC check and correct block 716 and the data from the write data queue 711, logically or arithmetically operated on by ALU 717 (based on the operand identified by memory hub control 713). At the EDC code generation block 719, a new series of check bits are developed based on the write data, and merged with this data consistent with the selected EDC algorithm. The resulting combination of data and check bits (heretofore referred to as 'data') is then coupled to the write data selector MUX 720, where it is then forwarded, under the control of memory hub control 713, to the memory device data interface 715 for subsequent transfer to the one or more memory devices 509.

As further clarification, burst data transfers other than those targeted for update, bypass the ALU 717 via read selector MUX 718 to have ECC check bits generated by the EDC code generation block 719. Update command data from the write data queue 711 is provided to the ALU 717 and, at the same relative time, specific read data targeted for update is provided to the ALU 717, where the selected memory read data is logically or arithmetically operated on with an update command and an associated data operand from memory hub control 713. As suggested by the exemplary embodiments, the sequence of operations and the specific operations themselves may be implemented in different sequences or combinations, with some functions bypassed in total, based on the application requirements, while still completing local data modification for sub-cache line address ranges.

FIG. 8 illustrates a sequence of operations associated with sub-cache line accesses using memory devices operating in a 'burst 4' mode (with two data transfers per cycle). The operations shown in FIG. 8 relate to activity on the memory address and control bus 714 (identified as "ary0 A") and the memory device data bus 708 (identified as "ary0 D"), in response to four memory update commands (identified as 0 through 3). In this example, when servicing memory update commands, the memory hub control 713 maintains the DRAM row open or activated (denoted as "Rx") throughout the RMW sequence—hence no closing (e.g. 'precharge') and re-opening of the memory device row is shown. For example; R0 in cycle 1 (as shown in row "ary 0 A") activates the row address acted upon by the read associated with update command "0", Cr0 in cycle 5 initiates the read for the same update command "0" with the column address, and the memory device responds with the 2 transfers of data (as shown in row "ary 0 D" as Dr0) in each of cycles 10 and 11 (consistent with a burst of 4 operation). The read data is processed through the memory data interface 715 and modify pipeline 721 during cycles 11 through 14, and the modified data is written back to the memory device(s) in cycles 15 and 16 (shown in row "ary 0 D" as Dw0). Other memory device accesses may occur concurrently or otherwise overlap with a scheduled RMW, but only when these operations are to device addresses that are not affected by those operations associated with the first scheduled read-modify-write operation(s). The subsequent operations (shown as "1", "2" and "3") are also included in the figure as overlapping operations, are illustrative of the memory device bus activity that could occur in normal operation, and following the same naming convention as the operation that is described.

Figure 9:
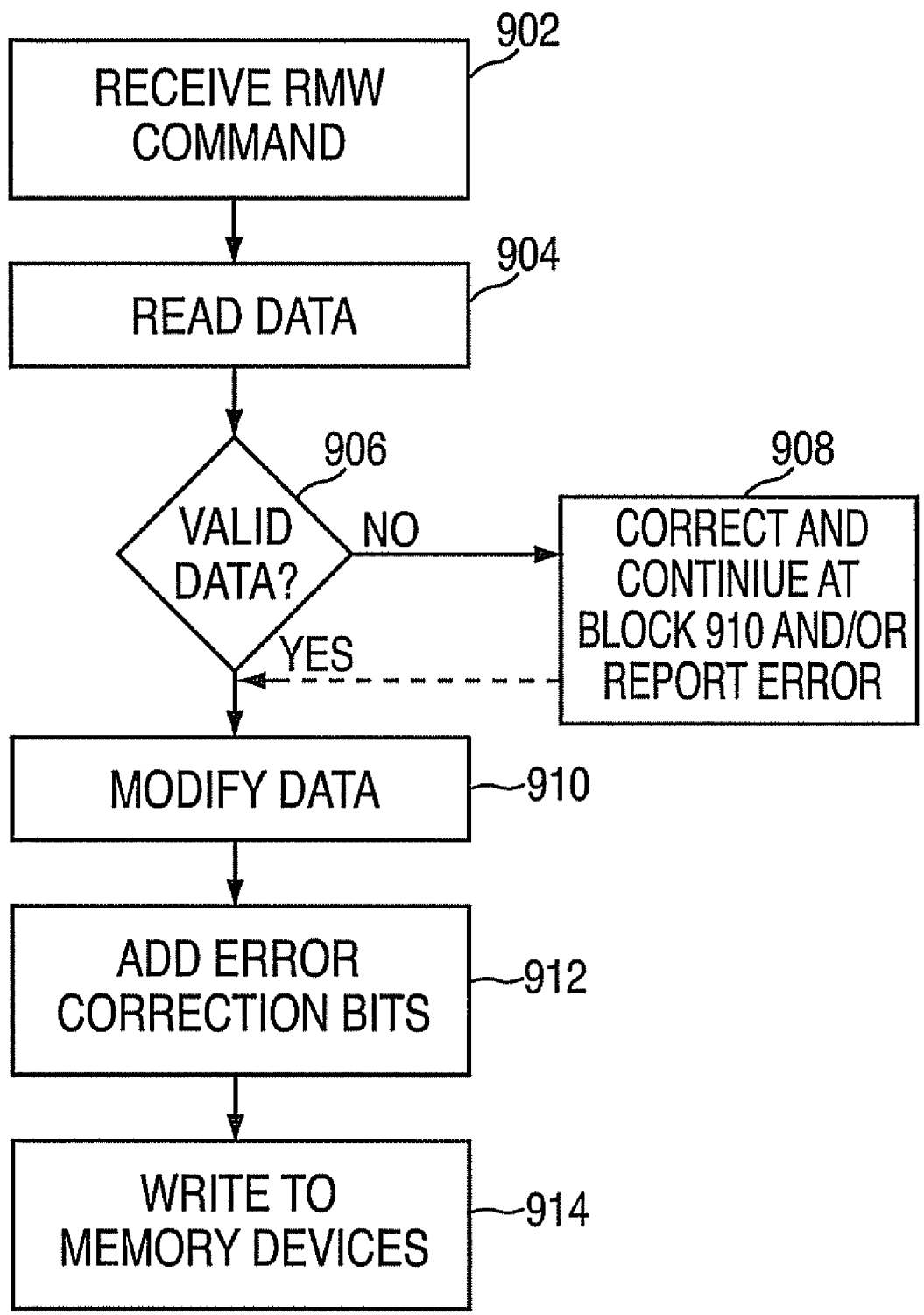
FIG. 9 is a flow diagram of a process that may be implemented by exemplary embodiments.

FIG. 9 depicts a process flow for servicing sub-cache line RMW access requests at hub devices 504 that may be implemented by exemplary embodiments. As described previously, all the processing described in reference to FIG. 9 is performed within the memory subsystem by the memory hub device 504. At block 902 in FIG. 9, a memory update command is received at a hub device 504. As described above, the link interface 704 receives the memory update command via the bus 506 and stores the write data (which may also be an operand as data) in the write data queue 711 via the internal bus 712. At block 904 in FIG. 9, data at the address specified by the command is read. The memory hub control 713 requests the data from the memory devices 509 on the memory address and control bus 714. The data is received from the memory device data bus 708 into the memory device data interface 715. At block 906 in FIG. 9, a check is performed to determine that the read data is valid data. In exemplary embodiments, the read data is transmitted along an internal bus 705 to the EDC check and correct block 716. If the data is not valid, then block 908 in FIG. 9 is performed and the data is corrected with processing continuing at block 910 in FIG. 9 and/or the error is reported.

If the data is valid, as determined at block 906 in FIG. 9 or upon correction of the data in block 908, then block 910 in FIG. 9 is performed to modify the data. If the RMW command is a write command with no data modification (as determined by the memory hub control 713), then the data exits the EDC check and correct block 716 and directly enters the read selector MUX 718 along with the data in the write data queue 711. If the RMW command does require data modification (as determined by the memory hub control 713), then the data exits the EDC check and correct block 716 and enters the ALU 717 to perform the modification. The modified data is input to the read selector MUX 718. At block 912 in FIG. 9, the error correction bits are added to the data by the EDC code generation block 719. The data is then written to the memory devices 509 via the memory device data interface 715 at block 914 in FIG. 9. As described previously, the data being written is either the data modified by the ALU 717 with error correction bits added, or data from the write data queue 711 with error correction bits added. In this manner, the RMW command is contained within the memory hub device 504.

In alternate exemplary embodiments, the EDC check and correct block 716 generates an error alert that is transmitted to the memory controller 510 to alert the memory controller 510 of the error. In alternate exemplary embodiments, the error alert is transmitted to a service processor or other error reporting/recovery circuitry. In addition to or instead of reporting an error alert, the memory hub device 504 may generate a completion alert that is transmitted to the memory controller 510 to communicate the completion of the RMW, or memory update command. The transmission of the error alert and/or completion alert may be via the memory bus 506 and/or via another bus that communicates between the hub device 504 and the memory controller 510 and/or the appropriate system logic circuitry.

Memory subsystems, where the hub device 504 is located, may be implemented by a variety of technologies including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The memory subsystems utilized by exemplary embodiments may have pincounts ranging from 100 pins to over 300 pins.

In exemplary embodiments, the memory bus 506 is constructed using multi-drop connections to the memory subsystems and/or using point-to-point connections. The downstream portion of the controller interface (or memory bus 506), referred to as the downstream bus, may include command, address, data and other operational, initialization or status information being sent to the memory modules. Each memory module, e.g., via the link interface 704, may simply forward the information to the subsequent (or downstream) module(s) via bypass circuitry; receive, interpret and re-drive the information if it is determined to be targeting a downstream memory module; re-drive some or all of the information without first interpreting the information to determine the intended recipient; or perform a subset or combination of these options.

The upstream portion of the memory bus 506, referred to as the upstream bus, returns requested read data and/or error, status or other operational information, and this information may be forwarded to the subsequent memory module(s) via bypass circuitry; be received, interpreted and re-driven if it is determined to be targeting an upstream memory module and/or memory controller in the processor complex; be re-driven in part or in total without first interpreting the information to determine the intended recipient; or perform a subset or combination of these options. In exemplary embodiments, the memory bus 506 is implemented as two unidirectional busses 506, in other embodiments the memory bus 506 is implemented as a single bidirectional bus 506.

Although not shown in FIG. 7, the hub device 504 may also include a separate bus, such as a 'presence detect' bus, an I2C bus and/or an SMBus which is used for one or more purposes including the determination of the memory subsystem attributes (generally after power-up), the reporting of fault or status information to the system, such as that defined in block 908, the configuration of the memory subsystem(s) after power-up or during normal operation or other purposes. Depending on the bus characteristics, this bus might also provide a means by which the valid completion of operations could be reported by the memory subsystem(s) to the memory controller(s), or the identification of failures occurring during the execution of the main memory controller requests.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device 504, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub devices, hub logic chips, registers, PLL's, DLL's, non-volatile memory, etc.) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hub devices, buffers, registers, clock devices, passives and other memory support devices and/or components may be attached to the memory subsystem, via various methods including solder interconnects, conductive adhesives, socket structures, pressure contacts and other methods which enable communication between the two or more devices via electrical, optical or alternate means.

The memory subsystem(s) may be connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc.

As used herein, the term memory subsystem refers to, but is not limited to: one or more memory devices; one or more memory devices and associated interface and/or timing/control circuitry; and/or one or more memory devices in conjunction with a memory buffer, hub, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry.

Additional functions that may reside local to the memory subsystem include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) 509 are attached, or may be mounted to a separate interposer or substrate also produced using one or more of various plastic, silicon, ceramic or other materials which include electrical, optical or other communication paths to functionally interconnect the support device(s) to the memory device(s) 509 and/or to other elements of the memory or computer system.

Information transfers along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization (such as described in U.S. Pat. No. 6,381,685 to Dell et al., of common assignment herewith) including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits of exemplary embodiments include the ability to perform memory update commands locally in the memory subsystem (or hub device in the memory subsystem) without requiring information transfer to the memory controller. This will result in improved overall performance because the commands are serviced locally. In addition, this will result in less traffic on the memory bus(ses) between the hub device and the controller.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A memory system for storing and retrieving data for a processing system, the memory system comprising:
    a plurality of memory devices;
    a memory controller for receiving and responding to memory access requests including memory update requests from a processor and for generating a memory update command in response to receiving a memory update request;
    one or more memory busses connected to the memory controller; and
    a memory hub device comprising:
        a first port in communication with the memory controller via one or more of the memory busses for transferring data and control information between the memory hub device and the memory controller;
        a second port in communication with one or more of the memory devices; and
        a control unit for decoding the memory update command from the data and control information and for accessing the memory devices via the second port to perform the memory update command local to the memory hub device as a logical read-modify-write sequence.

2. The memory system of claim 1, wherein the memory update command is a sub-cache line operation.

3. The memory system of claim 1, wherein the hub device further comprises one or more arithmetic logic units (ALUs) for altering memory data responsive to the memory update command from the memory controller.

4. The memory system of claim 3, wherein the hub device further comprises an error correction and detection (EDC) unit for detecting data errors in selected read data and for generating new error correction codes for data generated by the ALU.

5. The memory system of claim 4, wherein the EDC unit includes a software interface for independently disabling one or more of the detecting and the generating.

6. The memory system of claim 1, wherein the memory hub device further comprises a write data queue for holding data received at the memory hub device to be later written to the memory devices.

7. The memory system of claim 6, wherein the memory hub device stores write data associated with the read-modify-write sequence in the write data queue.

8. A memory subsystem for storing and retrieving data for a processing system, the memory subsystem comprising:
   a plurality of memory devices; and
   a memory hub device comprising:
   a first port in communication with a memory controller via one or more memory busses for transferring data and control information between the memory hub device and the memory controller;
   a second port in communication with one or more of the memory devices; and
   a control unit for decoding the memory update command from the data and control information and for accessing the memory devices via the second port to perform the memory update command local to the memory hub device as a logical read-modify-write sequence.

9. The memory subsystem system of claim 8, wherein the memory update command is a sub-cache line operation.

10. The memory subsystem of claim 8, wherein the hub device further comprises one or more arithmetic logic units (ALUs) for altering memory data responsive to the memory update command from the memory controller.

11. The memory subsystem of claim 10, wherein the hub device further comprises an error correction and detection (EDC) unit for detecting data errors in selected read data and for generating new error correction codes for data generated by the ALU.

12. The memory subsystem of claim 11, wherein the EDC unit includes a software interface for independently disabling one or more of the detecting and the generating.

13. The memory subsystem of claim 10, wherein the memory hub device further comprises a write data queue for holding data received at the memory hub device to be later written to the memory devices.

14. The memory subsystem of claim 13, wherein the memory hub device stores write data associated with the read-modify-write sequence in the write data queue.

15. A memory hub device comprising:
   a first port in communication with a memory controller via one or more memory busses for transferring data and control information between the memory hub device and the memory controller;
   a second port in communication with one or more memory devices; and
   a control unit for decoding the memory update command from the data and control information and for accessing the memory devices via the second port to perform the memory update command local to the memory hub device as a logical read-modify-write sequence.

16. The memory hub device of claim 15, wherein the memory update command is a sub-cache line operation.

17. The memory hub device of claim 15, further comprising one or more arithmetic logic units (ALUs) for altering memory data responsive to the memory update command from the memory controller.

18. The memory hub device of claim 17, further comprising an error correction and detection (EDC) unit for detecting data errors in selected read data and for generating new error correction codes for data generated by the ALU.

19. The memory hub device of claim 18, wherein the EDC unit includes a software interface for independently disabling one or more of the detecting and the generating.

20. The memory hub device of claim 18 wherein the memory hub device generates an error alert in response to one or more of the EDC unit detecting an error and the memory hub device detecting an update error.

21. The memory hub device of claim 15, further comprising a write data queue for holding data received at the memory hub device to be later written to the memory devices.

22. The memory hub device of claim 21, wherein the memory hub device stores write data associated with the read-modify-write sequence in the write data queue.

23. The memory hub device of claim 15 wherein the memory hub device generates a completion alert in response to the memory update command being completed.

24. A method for executing a memory command, the method comprising:
   receiving a memory update command including an address and update data from a memory controller, the receiving via one or more memory busses at a memory hub device that includes two or more ports;
   accessing one or more memory devices associated with the address; and
   performing the memory update command on the memory devices as a logical read-modify-write sequence, the performing responsive to the update data and the performing local to the memory hub device.

25. The method of claim 24 wherein the memory update command is a sub-cache line operation.

26. The method of claim 24 wherein the performing includes:
   reading current data associated with the address from the one or more memory devices;
   modifying the current data in response to the update data and the memory update command resulting in modified data; and
   writing the modified data to the one or more memory devices at the address.

27. The method of claim 26 wherein the modifying is performed by one or more ALUs.

28. The method of claim 26 wherein the modifying includes replacing the current data with the update data.

29. The method of claim 26 wherein the reading includes using an EDC unit to detect any errors in the current data.

30. The method of claim 29 wherein if the EDC unit detects any errors then the reading further includes one or more of using the EDC unit to correct the errors and generating an error alert.

31. The method of claim 26 the modifying writing includes using an EDC unit to generate new error correction codes for the modified data.

32. The method of claim 26 wherein the writing includes holding the modified data in a write data queue to be written later to the one or more memory devices.

33. The method of claim 26 further comprising generating a completion alert in response to the memory update command being completed by the hub device.

* * * * *